US010822011B2

(12) United States Patent
Rusche et al.

(10) Patent No.: US 10,822,011 B2
(45) Date of Patent: Nov. 3, 2020

(54) PALLET TRUCK WITH PRESSED FORK STRUCTURE

(71) Applicant: UniCarriers Americas Corporation, Marengo, IL (US)

(72) Inventors: Mark Rusche, Cary, IL (US); Ryan Giovannini, Marengo, IL (US); Mark McGee, Crystal Lake, IL (US); Ryan Ickes, Rockton, IL (US); Steve Williams, Hoffman Estates, IL (US)

(73) Assignee: UNICARRIERS AMERICAS CORPORATION, Marengo, IL (US)

( * ) Notice: Subject to any disclaimer, the term of this patent is extended or adjusted under 35 U.S.C. 154(b) by 408 days.

(21) Appl. No.: 15/696,777

(22) Filed: Sep. 6, 2017

(65) Prior Publication Data
US 2018/0065653 A1  Mar. 8, 2018

Related U.S. Application Data

(60) Provisional application No. 62/495,607, filed on Sep. 7, 2016.

(51) Int. Cl.
| | |
|---|---|
| *B21D 22/02* | (2006.01) |
| *B62B 3/12* | (2006.01) |
| *B62B 3/06* | (2006.01) |
| *B21D 28/00* | (2006.01) |
| *B21D 53/88* | (2006.01) |
| *B21D 53/68* | (2006.01) |
| *B21D 35/00* | (2006.01) |

(52) U.S. Cl.
CPC ............ *B62B 3/0612* (2013.01); *B21D 22/02* (2013.01); *B21D 28/00* (2013.01); *B21D 35/001* (2013.01); *B21D 53/68* (2013.01); *B21D 53/88* (2013.01); *B62B 3/0618* (2013.01); *B62B 3/12* (2013.01); *B62B 2203/20* (2013.01); *B62B 2203/28* (2013.01); *B62B 2501/04* (2013.01)

(58) Field of Classification Search
CPC ....... B62B 3/12; B62B 3/0606; B62B 3/0612; B62B 3/0618; B62B 3/0625; B62B 3/0613; B62B 5/0006; B66F 9/06; B66F 9/065

See application file for complete search history.

(56) References Cited

U.S. PATENT DOCUMENTS

| | | | | |
|---|---|---|---|---|
| 5,752,584 A | * | 5/1998 | Magoto | ..................... B62B 3/06 187/231 |
| 2003/0197351 A1 | * | 10/2003 | Burger | ................ B66F 9/07504 280/651 |

(Continued)

OTHER PUBLICATIONS

YouTube video clip entitled "Replace the load wheels on a pallet jack", 1 page, uploaded on Jul. 13, 2015 by user "Generic Parts Service". Retrieved from internet: <https://www.youtube.com/watch?v=G0t8A6gNEZ0&t=6s>.

*Primary Examiner* — Bryan A Evans

(74) *Attorney, Agent, or Firm* — Norton Rose Fulbright US LLP

(57) ABSTRACT

A pallet truck has a pressed and non-welded fork structure. The fork structure includes an elongate body portion and an outboard end portion integrally formed with the body portion. The body portion has a top wall and opposing sidewalls integrally formed with the top wall. The outboard end portion projects from the body portion and includes a tip sidewall defining a tip region for guiding entry of a fork assembly beneath a pallet.

16 Claims, 6 Drawing Sheets

(56) References Cited

U.S. PATENT DOCUMENTS

2006/0272874 A1* 12/2006 Kraimer .............. B66F 9/07531
                                                    180/68.5
2008/0268277 A1* 10/2008 Hilfrich ................ B60J 5/0463
                                                    428/600
2015/0102274 A1*  4/2015 He ....................... B62B 3/0612
                                                    254/2 C

* cited by examiner

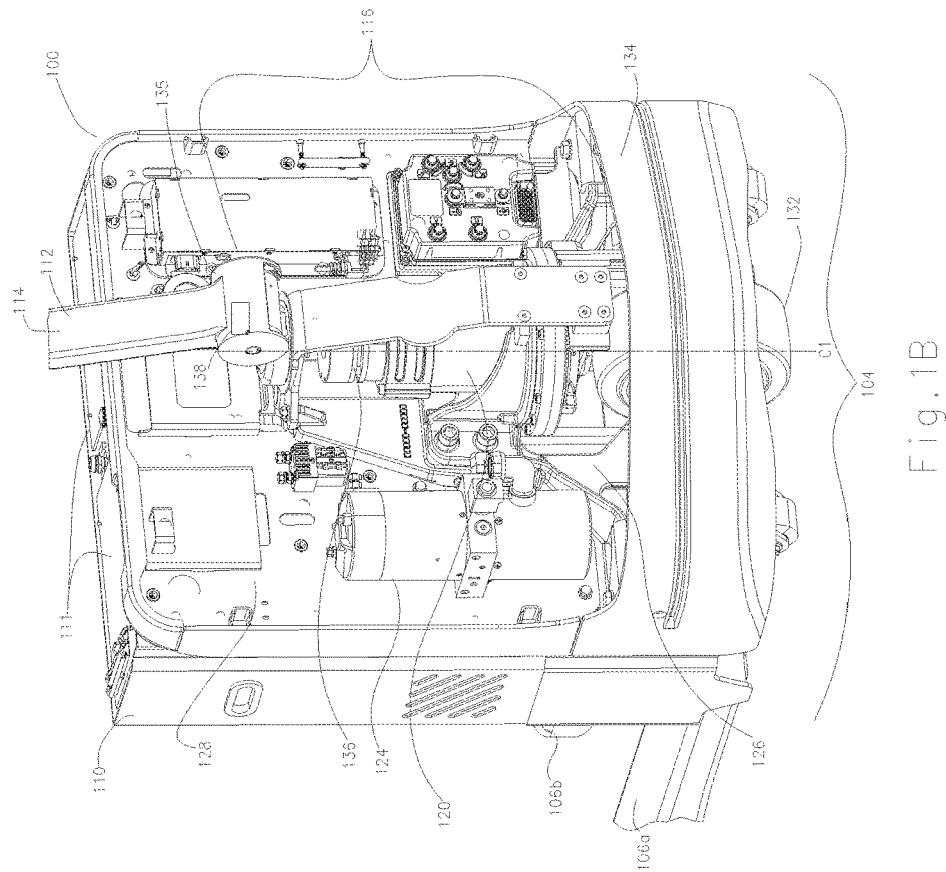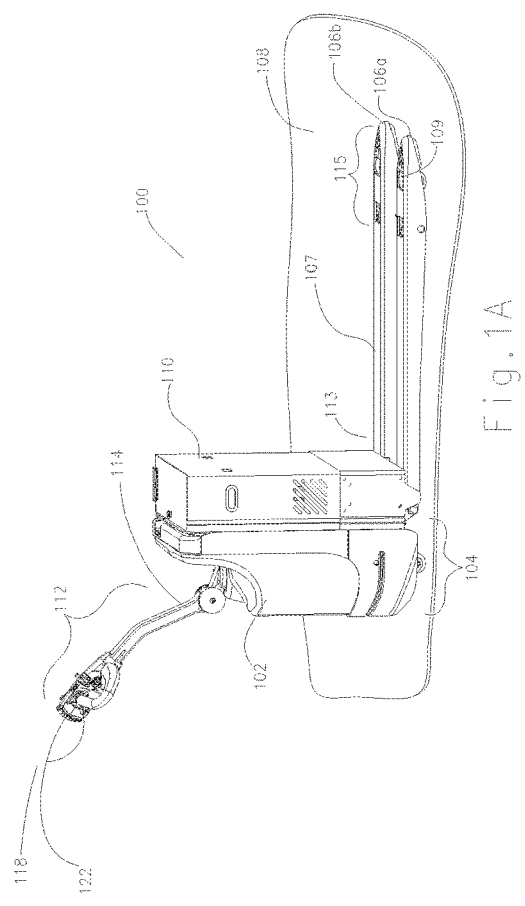

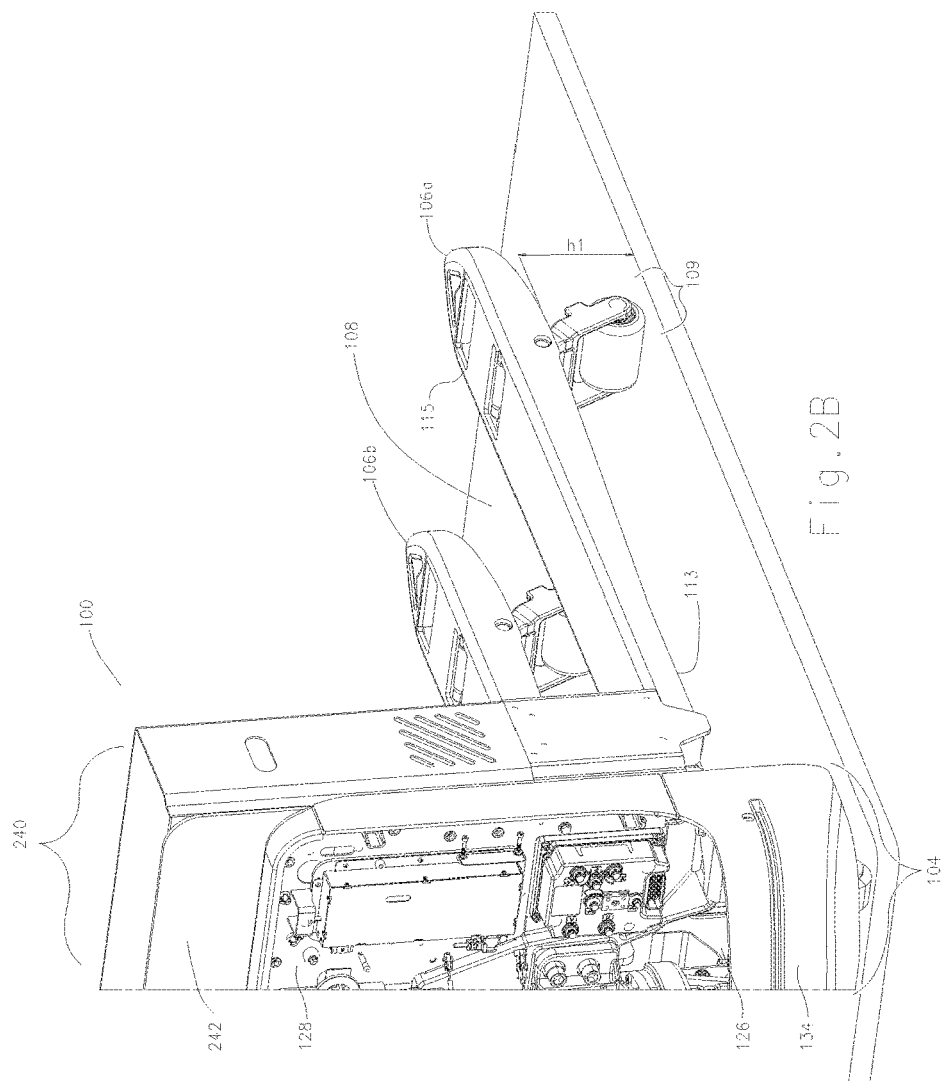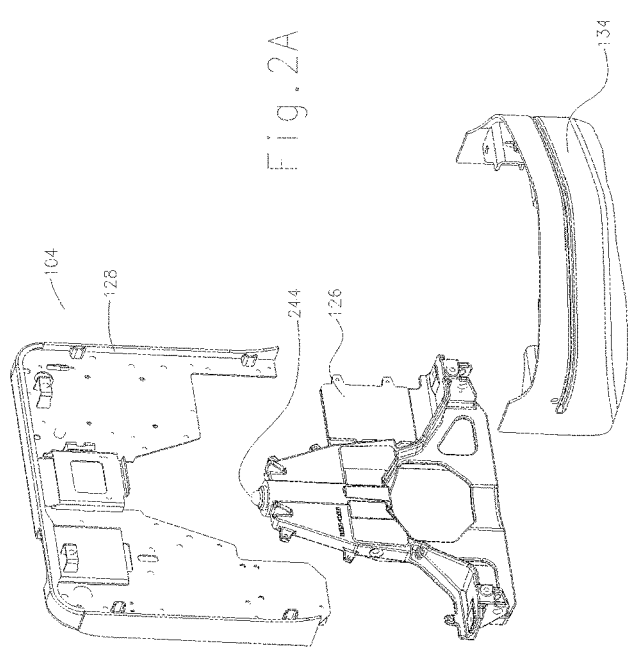

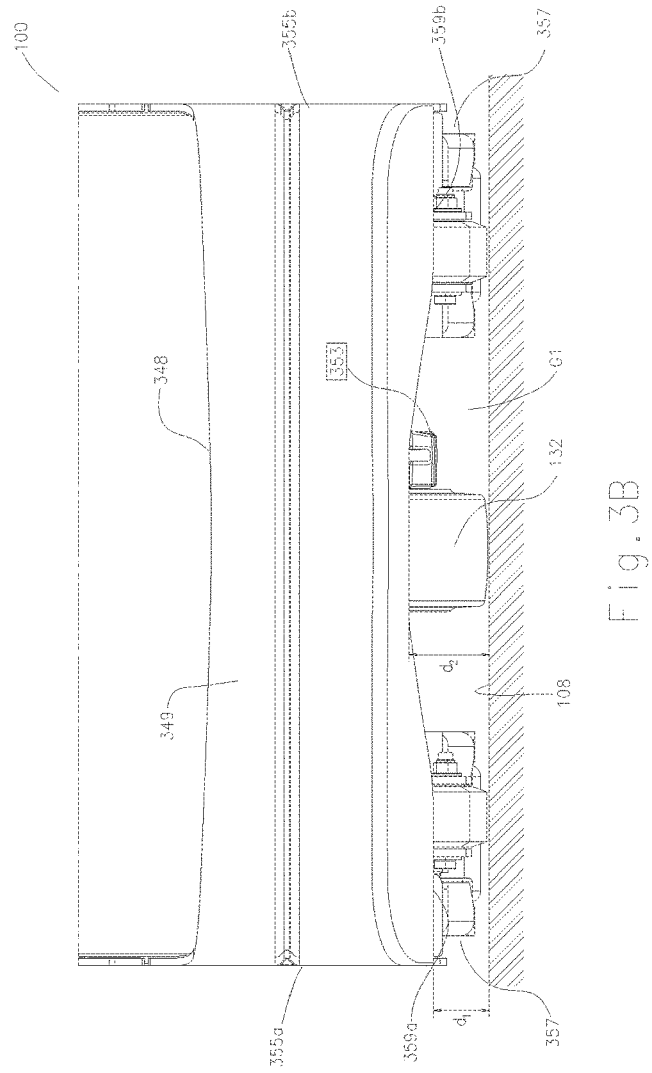
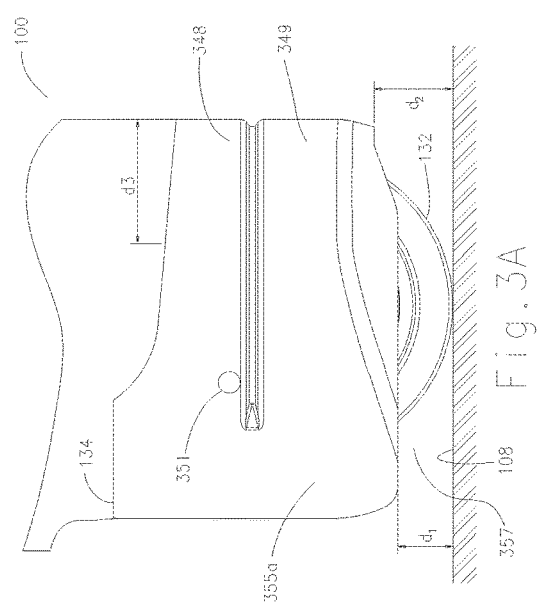

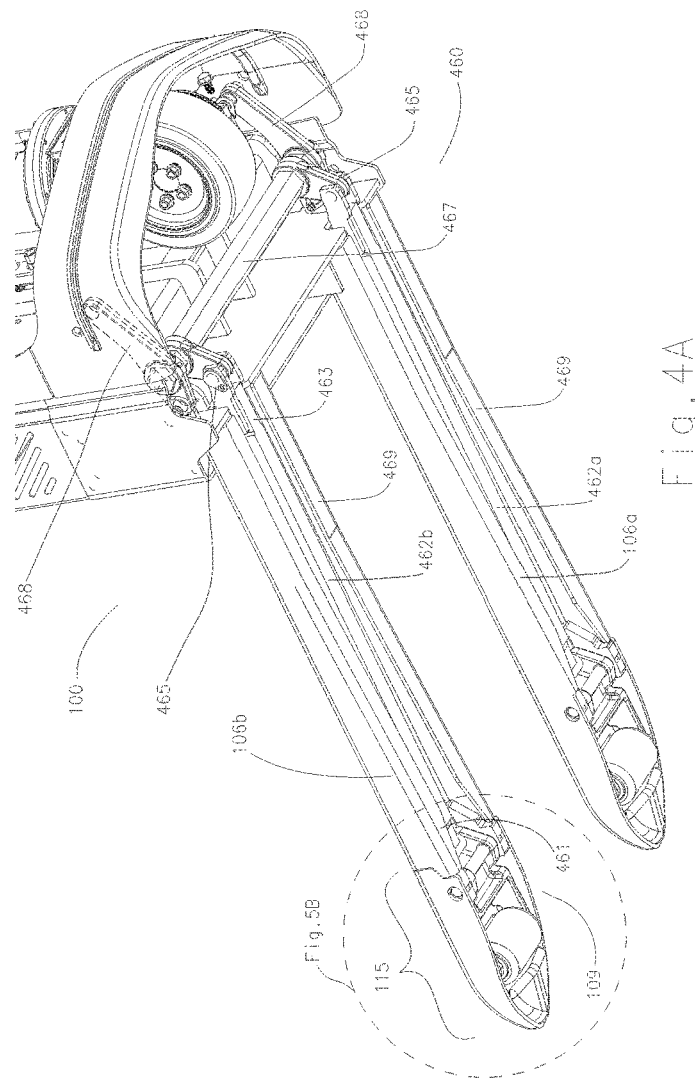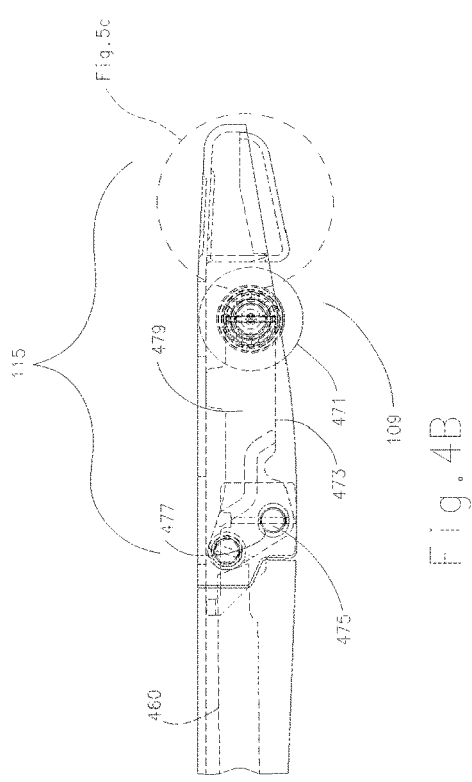

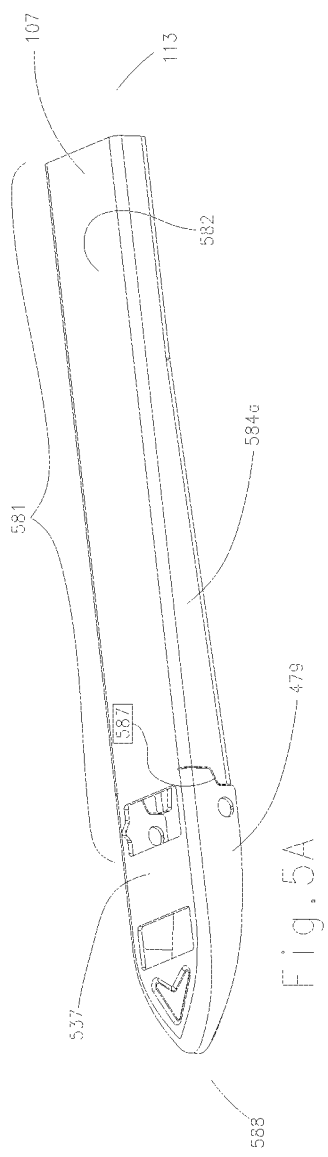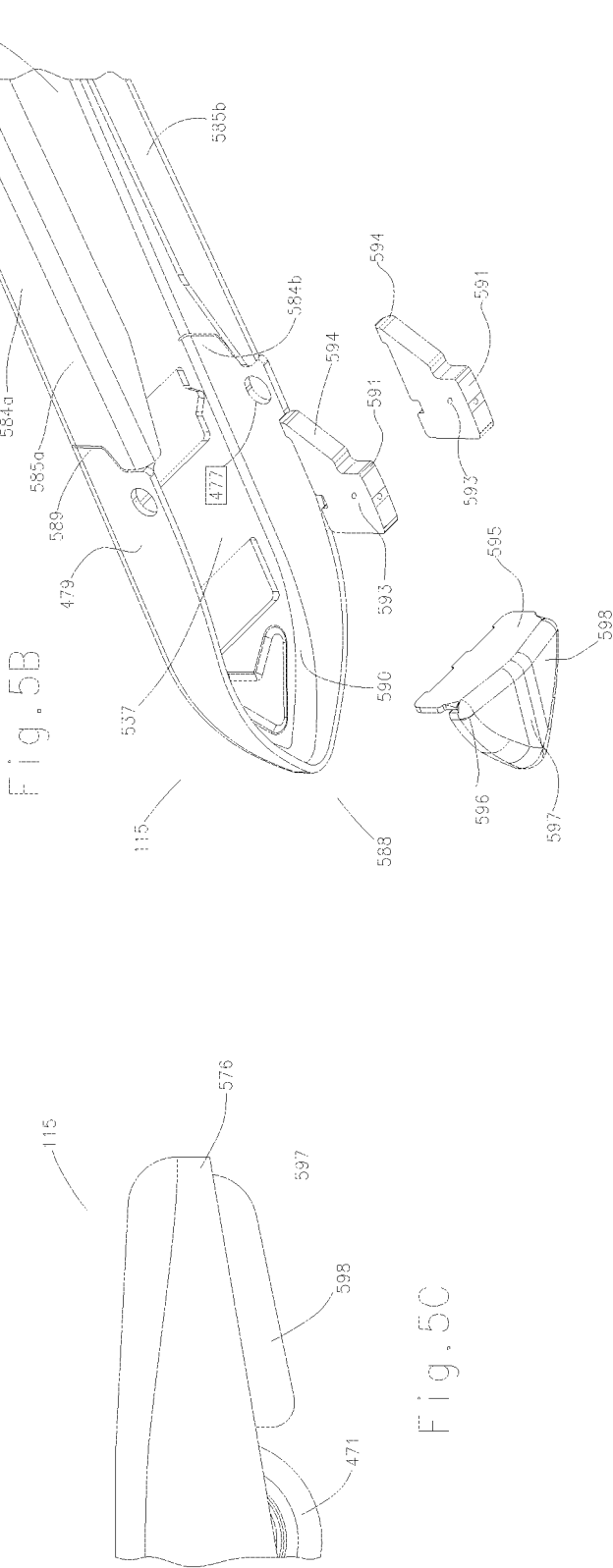

PALLET TRUCK WITH PRESSED FORK STRUCTURE

PRIORITY CLAIM

This application claims priority from U.S. Provisional Patent Application No. 62/495,607, filed on Sep. 7, 2016, the entirety of which is hereby incorporated by reference herein.

TECHNICAL FIELD

The following disclosure relates generally to pallet trucks, and more particularly, to fork structures for pallet trucks.

BACKGROUND

A pallet truck is a type of vehicle used to lift and move pallets onto which heavy or light objects are placed. The forks of the jack are designed to slide below the deck boards of the pallet. Pallet trucks operate in a manner similar to a forklift, but are smaller in size and have a maximum lift height of typically less than 6 inches. A pallet truck can move and organize pallets inside a trailer or other area where there is no forklift access.

BRIEF DESCRIPTION OF THE DRAWINGS

FIG. 1A is a side view, and FIG. 1B is a front isometric view illustrating a pallet truck configured in accordance with an embodiment of the present technology.

FIG. 2A is an exploded isometric view of a lift assembly of the pallet truck, and FIG. 2B is a front isometric view of a lift structure of the lift assembly.

FIG. 3A is a side view, and FIG. 3B is a front view of the pallet truck showing a bumper of the truck configured in accordance with an embodiment of the present technology.

FIG. 4A is a bottom isometric view of the pallet truck showing a linkage system of the truck, and FIG. 4B is a side view of a load roller assembly coupled to a fork structure configured in accordance with an embodiment of the present technology.

FIG. 5A is a top isometric view of the fork structure, FIG. 5B is a partial isometric view of an outboard end portion of the fork structure taken from FIG. 4A, and FIG. 5C is an enlarged side view of the outboard end portion taken from FIG. 4B.

DETAILED DESCRIPTION

Figure 6A:
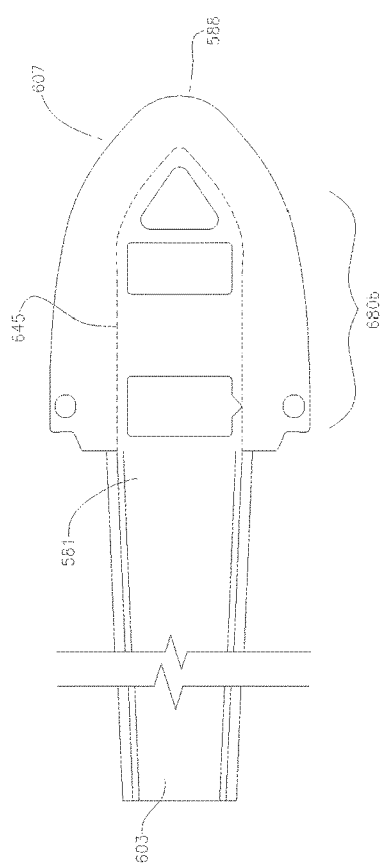
FIGS. 6A-6C are top views of a fork structure in selected stages of manufacturing in a method for making a fork structure in accordance with embodiments of the present technology.

A pallet truck is steered by a "tiller" that is connected to a main wheel or a pair of central wheels below the tiller. The forks of a pallet truck are lifted by a lift frame operably coupled to a single- or double-acting hydraulic lift cylinder. In a hand-powered pallet truck, the tiller can act as a pump handle that can be vertically manipulated for raising the forks of the truck. In a powered pallet truck, the tiller can include a separate lever or switch connected to the hydraulics for lifting the fork, while vertical manipulation of the tiller is used to control braking.

The pallet forks each include a retractable load roller at their outboard ends. The load roller is configured to lift/lower the outboard end in conjunction with the lift frame. The fork is typically constructed from multiple pieces of steel that are welded together to form the body and the tip of the fork. One challenge with welded structures is that the weld joints can be weaker than the parent material of the fork.

A pallet truck also includes casters beneath the lift frame and near the proximal end of each fork. Some lift assemblies have a housing that covers the internal components of the pallet truck. The bottom edge of the lift housing is separated from the floor by a clearance height that allows the housing to pass over objects, such as ramps, without interference between an object and the housing's bottom edge. The clearance height is typically 2 inches or less to protect operators from inadvertently sliding their feet beneath the lift assembly. This restricted clearance height can limit the maneuverability of the pallet truck.

This disclosure describes various embodiments of pallet forks and other structural components of pallet trucks. As described below, a pallet truck configured in accordance with an embodiment of the present technology can include a pressed and non-welded fork structure. The fork structure includes an elongated body portion and an outboard end portion integrally formed with the body portion. The body portion has a top wall and opposing sidewalls integrally formed with the top wall. The outboard end portion projects from the body portion and includes a tip sidewall defining a tip region for guiding entry of a fork assembly beneath a pallet. The fork structure is configured to extend generally laterally from a lift assembly.

In additional or alternate embodiments, the pallet truck can include a bumper that attaches to a lower section of the lift assembly. The bumper has lower edges at the sides of the bumper, and a medial edge between the lower edges. The lower edge provides a first clearance distance between the floor surface to protect an operator's feet during operation. The medial edge provides a second clearance distance that is larger than the first clearance distance. The second clearance distance is selected to provide suitable clearance for a drive wheel of the pallet truck.

In various embodiments, the pallet truck can also be referred to as a pallet jack, an electric pallet truck, a power jack, a walkie, or the like. In some embodiments, certain aspects of the technology, such as the non-welded fork structure, can be employed in vehicles other than pallet trucks, such as forklifts, having forks configured to lift and transport objects.

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, various elements and features illustrated in the Figures may not be shown to scale.

FIG. 1A is a side view, and FIG. 1B is a front isometric view illustrating a pallet truck 100 configured in accordance with an embodiment of the present technology. In FIG. 1B, an upper cover 102 (FIG. 1A) of the pallet truck 100 has been removed to show components of the truck 100 located beneath the cover 102. Referring to FIG. 1A, the pallet truck 100 includes a lift assembly 104, a battery housing 110 proximate the lift assembly 104, and first fork and second forks assemblies 106a and 106b (collectively "fork assemblies 106") extending laterally outward from the lift assembly 104. The battery housing 110 includes a compartment 111 (FIG. 1B) that contains batteries (e.g., rechargeable battery packs; not shown) for powering the pallet truck 100.

Each fork assembly 106 includes a pressed fork structure 107 having a proximal end portion 113 adjacent the battery housing 110, and an outboard end portion 115. The outboard end portion 115 is connected to a load roller assembly 109. In the example of FIG. 1A, each load roller assembly 109 is in a retracted position, and each fork assembly 106 is in a lowered position relative to a floor surface 108.

The pallet truck 100 further includes a tiller assembly ("tiller 112") having a tiller arm 114 that is articulated to a steering assembly 116 (FIG. 1B). The tiller arm 114 is coupled to a handle region 118 having various user controls 122, such as a safety reverse button and lift, speed, and direction control switches/levers. Referring to FIG. 1B, the user controls 122 (FIG. 1A) are coupled to a motor 120, a hydraulic pump 124, and other electrical and mechanical components (not labeled), e.g., valves, solenoids, controllers, sensors, etc. The motor 120 and the hydraulic pump 124 are mounted to lower and upper frame sections 126 and 128, respectively, of the lift assembly 104. The upper frame section 128 can be attached to the lower frame section 126 by a plurality of fasteners (not labeled), such as bolts, and corresponding locking features, such as threaded through-holes or lock nuts. The motor 120 is operably coupled to a drive wheel 132 which is steered by the steering assembly 116 via the tiller 112. The drive wheel 132 is partially covered by a lower cover, or bumper 134, connected to opposite sides of the lower frame section 126.

The steering assembly 116 is rotated by the tiller 112 about a central axis $C_1$. The tiller arm 114 is operably coupled to a brake 136 connected to the drive shaft of the motor 120. The brake 136 can be for example, a power-off, friction brake. The tiller arm 114 pivots in a generally vertical direction about a pivot joint 135. The pivot joint 135 includes an internal brake-release detector 138 (shown schematically) configured to detect when the brake 136 should be released based on the vertical position of the tiller 112. Although not described in detail for purposes of clarity, the pallet truck can include other mechanical and electrical components. For example, in some embodiments, the pallet truck can include braking and other control components described in U.S. patent application Ser. No. 15/696,854, filed Sep. 6, 2017, and titled "Pallet Truck with Brake Release and Lower Brake Zone Detection Mechanism," which is incorporated herein in its entirety by reference.

FIG. 2A is an exploded isometric view of the lift assembly 104 showing the lower and upper frame sections 126 and 128 in more detail, and FIG. 2B is a front isometric view of a lift structure 240 of the lift assembly 104. Referring to FIG. 2B, the lift structure 240 includes a lift plate 242 coupled to a central lift cylinder 244 (FIG. 2A) that is integrally formed with the lower frame section 126 of the lift assembly 104. The lift plate 242 is coupled to the proximal end portion 113 of each fork assembly 106. In operation, the lift structure 240 is configured to lift each fork's proximal end portion 113, and the load roller assembly 109 is configured to concurrently lifts the outboard end portion 115. Each fork assembly is lifted to a pre-set height $h_1$ above the floor surface 108.

Referring to FIG. 2A, the frame sections 126 and 128 and the lift structure 240 can be formed from metal. For example, the lower frame section 126 can be formed from cast metal (e.g., an iron casting). The upper frame section 128 and the lift structure 240 can be formed from steel, such as welded steel plates. The bumper 134 can be formed from metal, such as pressed steel, aluminum, or other durable materials (e.g., structural plastic).

FIG. 3A is a side view, and FIG. 3B is a front view of the pallet truck 100 showing the bumper 134 in further detail. Referring to FIG. 3A, the bumper 134 includes a base portion 348 having an outer surface 349. The bumper 134 can include through-holes 351 (only one through hole is visible in FIG. 3A) that extend through the base portion 348 at opposite sides 355 (identified individually as a left side 355a and a right side 355b (FIG. 3B)). Through-holes 351 are access holes to drive out lift link pins.

In one aspect of the technology, the bumper 134 can be readily removed from the lower frame section 126 for ease of access to the drive wheel 332 and other components (e.g., the transmission) for maintenance and repair. In a related aspect, the bumper 134 is replaceable as a single unit, such as if the bumper 134 is subjected to substantial wear and tear over extended use. In another aspect of the technology, the bumper 134 can be a structural component that is configured to support stability tabs 357 (e.g., spring-loaded casters) mounted internally at the bumper's sides 355. In some embodiments, casters (not shown) can be used in lieu of the stability tabs 357.

Referring to FIG. 3B, the bumper 134 has a first lower edge 359a adjacent the bumper's left-side 355a, and a second lower edge 359b adjacent the bumper's right-side 355b. The first lower edge 359a and the second lower edge 359b (collectively "lower edges 359") have a first clearance distance $d_1$ above the floor surface 108. The lower edges 359 can be rounded and curve inwardly relative to the outer surface 349. The lower edges 359 are configured to prevent operators from inadvertently sliding their feet or toes beneath the bumper 134 during operation. In some embodiments, the first clearance distance $d_1$ can be equal to or less than about 2 inches.

The bumper 134 further includes a medial edge 353 extending between and generally continuous with the lower edges 359. The medial edge 353 extends (e.g., curves) upwardly from each lower edge 359 and defines a gap $G_1$ through which a portion of the drive wheel 132 is exposed. The medial edge 353 has a second clearance distance $d_2$ above the floor surface 108 near the drive wheel 132. In one aspect of this embodiment, the medial edge 353 is inset from the sides 355 of the bumper 134 and away from the position of an operator's feet during normal use. In another aspect of this embodiment, the second clearance distance $d_2$ is greater than the first clearance distance $d_2$ to provide suitable clearance for the drive wheel 132 when it is driven over ramps and other structures. In some embodiments, the second clearance distance $d_2$ can be in the range of about 2.5 inches to about 3.5 inches (e.g., 3 inches). In various embodiments, the medial edge 353 can be curved and/or sized to provide suitable clearance for the drive wheel 132 and protection for the operator's feet. Referring back to FIG. 3A, the base portion 348 of the bumper 134 can be laterally offset from the drive wheel 332 by a distance $d_3$ to maintain separation between the operator's foot and the drive wheel 132.

FIG. 4A is a bottom isometric view of the pallet truck 100 showing a linkage system 460 coupled to the lift assembly 104, and FIG. 4B is a side view of the load roller assembly 109 coupled to the linkage system 460. Referring to FIG. 4A, the linkage system 460 includes individual push bars 462 (identified individually as a first push bar 462a and a second push bar 462b) that are received in a channel 469 within a corresponding one of the first and second fork assemblies 106a and 106b, respectively. A distal end 461 of each push bar 462 is coupled to the load roller assembly 109 at the outboard end portion 115 of the corresponding fork. A proximal end 463 of each push bar 462 is coupled to a linkage bar 467 below the lift assembly 104 via a first linkage 465. The linkage bar 467 is pivotally coupled to the lower frame section 126 (FIG. 1A) via second linkages 468 (e.g., rocker arms) located at opposite ends of the linkage bar 467. The second linkages 468 are operably coupled to the lift cylinder 244 (FIG. 2B). In the illustrated embodiment, the linkage bar 467 has a hexagonal cross-section, and the first and second linkages 465 and 468 are detachable from the bar. In other embodiments, the linkage bar 467 can have a circular cross-section, and the first linkages 465 and/or the second linkages 468 can be integral or welded to the linkage bar 467.

In use, the linkage system 460 operates in a conventional manner to lift each fork's outboard end portion 115 via rotation of the linkage bar 467. For example, rotation of the linkage bar 467 in the clockwise direction, as shown by the arrow, urges the push bars 462 in the outward direction to extend each load roller assembly 109, while counterclockwise rotation pulls the push bars 462 in the opposite direction to retract each load roller assembly 109.

Referring to FIG. 4B, each load roller assembly 109 includes a load roller 471 (e.g., a polyurethane wheel) operably coupled to a wheel fork 473 (shown in hidden lines). The wheel fork 473 includes a pivot feature 475 that inserts into pivot hole 477 formed in a tip sidewall 479 of the fork's outboard end portion 115. In operation, the wheel fork 473 is configured to pivot via the pivot feature 475 within the pivot hole 477 in response to a corresponding one of the push bars 462 (FIG. 4B) pushing outwardly (i.e., to extend the load roller assembly 109) or pulling inwardly (i.e., to retract the load roller assembly 109), as described above.

FIG. 5A is a top isometric view of the fork structure 109, FIG. 5B is a partial isometric view of the fork's outboard end portion 115 taken from FIG. 4A, and FIG. 5C is an enlarged few of the outboard end portion 115 taken from FIG. 4B. Referring to FIGS. 5A and 5B together, the fork structure 107 includes an elongate body portion 581 having a top wall 582, integral and opposing sidewalls 584 (identified individually as a first sidewall 584a and a second sidewall 584b), and integral bottom walls, or flanges 585 (identified individually as a first flange 585a and a second flange 585b), extending inwardly from a corresponding one of the sidewalls 584. The top wall 582, the sidewalls 584, and the flanges 585 form the interior channel 469 that receives one of the push bars 462 (FIG. 4A) of the linkage system 460 (FIG. 4A). In the illustrated embodiment, the interior channel 469 has a "C"-shaped cross section. In other embodiments, the fork structure 107 can have a different cross-sectional shape. For example, in some embodiments, the flanges 585 can be omitted, and the fork structure 107 can have a "U"-shaped cross-section.

Referring to FIG. 5A, the top wall 582 and the sidewalls 584 taper toward the proximal end portion 113 of the fork. A portion 537 of the top wall 582 extends outboard of the opposing sidewalls 584 and terminates into the tip sidewall 479. The opposing sidewalls 584 terminates at a vertical edge 587 that is curved and slightly inset from a vertical edge 589 (FIG. 5B) of the tip sidewall 479. The tip sidewall 479 extends generally downwardly from the top wall 582 and defines a tip region 588 for guiding entry of the fork beneath a pallet.

Referring to FIG. 5B, the tip sidewall 479 and the top wall portion 537 define a cavity 590 beneath the tip region 588. The cavity 590 is configured to receive axle support members 591 of the load roller assembly 109 (FIG. 1A). The axle support members 591 can be attached (e.g., welded) to the interior side of the tip sidewall 479. Each of the axle support members 591 includes a through hole 593 adjacent one of the pivot holes 477, and a projection, such as a curved tab 594, adjacent the through-hole. The curved tab 594 engages the vertical edge 587 (FIG. 5A) of one of the opposing sidewalls 584 of the body portion 581.

The cavity 590 also receives a guide member 595. The guide member 595 has a contoured sidewall 596 that abuts the inner side of the tip sidewall 479, and an integral exterior wall 597 that is generally perpendicular to the contoured sidewall 597. As shown in FIG. 5C, the exterior wall 597 protrudes beyond the tip sidewall 479. The exterior wall 597 includes a contact surface 598 that generally faces the floor surface 108 (FIG. 1A).

In use, the guide member 595 is configured to reduce resistance between the fork's outboard end portion 115 and objects (e.g., ramps, pallet boards, etc.) on the floor surface 108 (FIG. 1A) over which the load roller 471 is lifted during use. In contrast to conventional pallet forks, which typically have a flat surface under the tip of the fork, the contact surface 598 can have a convex shape along the transverse axis of the guide member 595, as shown in FIG. 5B. The convex shape minimizes surface-to-surface contact with underlying objects, which in turn reduces the force required to slide over the underlying objects. The contact surface 598 can also be curved and/or angled. As shown in FIG. 5C, the contact surface 598 extends upwardly from the load roller 471 to a raised end 576 to provide additional clearance and further reduce the contact area.

In some embodiments, the guide member 595 can be formed from steel (e.g., pressed steel). In such embodiments, the guide member 595 can be welded and/or attached with fasteners to the tip sidewall 479. In other embodiments, the guide member 595 can be formed from or coated in other metals or materials, such as Teflon®.

Figure 6B:
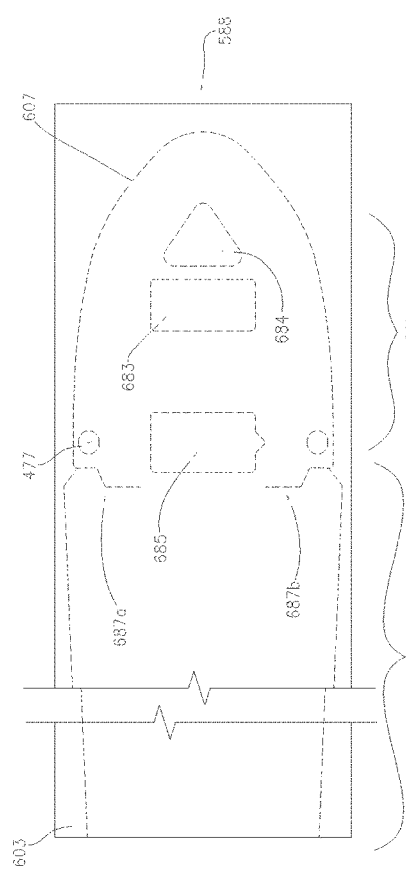
Figure 6C:
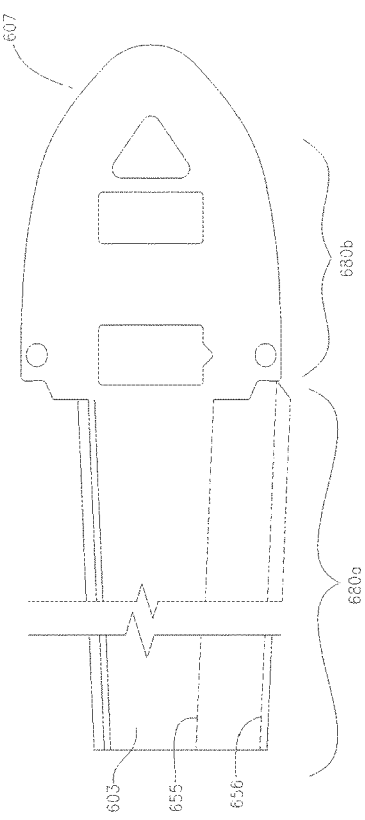

FIGS. 6A-6C are top views of a fork structure 607 in selected stages of manufacturing in a method for making a fork structure in accordance with embodiments of the present technology. Referring to FIG. 6A, the fork structure 607 can be formed from a single sheet of material 603, such as a sheet of ¼" steel (e.g., ASTM A36 steel). The material 603 can be (e.g., laser cut or stamped) to form a first region 680a corresponding to the fork's body portion 581 (FIG. 5A) and a second region 680b corresponding to the outboard end portion 115 (FIG. 1A). Cutting the material 603, includes forming seams 687 (identified individual as a first seam 687a and a second seam 687b) between the first and second regions 680a and 680b. The seams 687 defines the location of the vertical edges 587 (FIG. 5A) of the fork's opposing sidewalls 584 (FIG. 5A). The material 603 can also be cut to form the pivot holes 477, a slot 683 for the load roller 471 (FIG. 4B), and/or a slot 685 for the wheel frame 473 (FIG. 4B) during the same stage or at a different stage. In some embodiments, a depressed surface feature 684 (e.g., a visual guide feature) can be pressed into the upper surface of the material 603 near the tip region 588.

Referring to FIG. 6B, the material 603 is bent or pressed in the first region 680a to form the first sidewall 584a and the first flange 585a. The second sidewall 584b and the first flange 585b can be formed by bending or pressing the material 603 in a similar manner along bend lines 655 and 656, respectively. In some embodiments, the sidewalls 584 and the flanges 585 walls can be formed in a multi-stage (e.g., a two-stage) bending process using, e.g., a cam-actuated bending tool. In one aspect of this embodiment, the fork structure 107 is formed from a single sheet of material without any welding to form the sidewalls 584 and the flanges 585.

Referring to FIG. 6C, the tip sidewall 479 (FIG. 4B) is formed by pressing the second region 680b into the shape of a tip. A bend 645 is formed between the tip sidewall 479 (FIG. 4B) and the top wall 582 as the material 603 is subjected to plastic flow or deformation during pressing. In one aspect of the technology, the tip region 588 is integral with the body portion 581 such that the entire fork structure 607 is a single solid piece. In a related aspect, the fork structure does not include weld joints. In various embodiments, eliminating weld joints can also reduce manufacturing time and cost compared to conventional pallet forks, such as pallet forks with elongate bodies formed from multiple welded parts.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

We claim:

1. A pallet truck comprising:
   a lift assembly;
   a fork assembly having a fork structure extending generally laterally from the lift assembly, the fork structure including:
      an elongate body portion having:
         a top wall;
         opposing sidewalls integrally formed with the top wall; and
         bottom walls integrally formed with and extending inwardly from respective ones of the opposing sidewalls; and
      an outboard end portion integrally formed with the body portion and projecting therefrom, the outboard end portion including a tip sidewall defining a tip region for guiding entry of the fork assembly beneath a pallet; and
   a linkage system having a push bar operably coupled to a load roller assembly at the outboard end portion of the fork structure, the load roller assembly having a wheel fork that is pivotably coupled to the outboard end portion via a pivot feature that is received within an opening of the tip sidewalk;
   wherein the top wall, the opposing sidewalls, and the bottom walls of the body portion form an interior channel having a "C"-shaped cross section configured to receive the push bar.

2. The pallet truck of claim 1, wherein the fork structure includes a first region, a second region, and a seam between the first and second regions, wherein the first region is mechanically bent or pressed adjacent the seam to form the opposing sidewalls of the body portion, and wherein the second region is mechanically pressed adjacent the seam to form the tip sidewall of the outboard end portion.

3. The pallet truck of claim 1, wherein a portion of the top wall of the fork structure extends outboard of the opposing sidewalls of the body portion and terminates into the tip sidewall.

4. The pallet truck of claim 3, wherein the tip sidewall extends generally downwardly from the portion of the top wall and defines a cavity therewith.

5. The pallet truck of claim 4, wherein:
   each of the opposing sidewalls of the body portion terminates at a vertical edge that is inset from the tip sidewall; and
   the load roller assembly includes an axle support member that is received into the cavity and configured to engage the vertical edge of a corresponding one of the opposing sidewalls.

6. The pallet truck of claim 4, wherein:
   the fork assembly further includes a guide member that is received into the cavity; and
   the guide member has a convex surface configured to reduce resistance between the outboard end portion of the fork structure and objects on a floor surface over which the load roller assembly is lifted during use.

7. A method for manufacturing a fork structure for use with a pallet truck, the method comprising:
   cutting a sheet of material to form a first region, a second region, and a seam between the first and second regions;
   bending or pressing the first region to form a body portion of the fork structure, the body portion having:
      a top wall;
      opposing sidewalls that are integral with the top wall; and
      bottom walls that are integral with and extend from respective ones of the opposing sidewalls; and
   pressing the second region, including a portion of the top wall that extends beyond the body portion, to form a tip region that is integral with the body portion.

8. The method of claim 7, wherein pressing the second region includes forming a cavity in the tip region, and wherein the method further comprises inserting a guide member into the cavity and attaching the guide member to the tip region.

9. The method of claim 7, wherein pressing the second region includes forming a cavity in the tip region, and wherein the method further comprises:
   defining a vertical edge at one of the opposing sidewalls that is inset from a sidewall of the tip region; and
   inserting an axle support member into the cavity, wherein the axle support member engages the vertical edge.

10. The method of claim 7, wherein the sheet of material comprises steel.

11. The method of claim 10, wherein the sheet of material has a thickness of about ¼ inch.

12. A pallet truck comprising:
   a lift assembly;
   a fork assembly having a fork structure extending generally laterally from the lift assembly, the fork structure including:
      an elongate body portion having:
         a top wall; and
         opposing sidewalls integrally formed with the top wall;
         wherein a portion of the top wall extends outboard of the opposing sidewalls;
      an outboard end portion integrally formed with the body portion and projecting therefrom, the outboard end portion including:
         a tip sidewall defining a tip region for guiding entry of the fork assembly beneath a pallet;
         wherein the portion of the top wall terminates into the tip sidewall; and wherein the tip sidewall extends generally downwardly from the portion of the top wall and defines a cavity therewith;

a load roller assembly at the outboard end portion of the fork structure, the load roller assembly having a wheel fork that is pivotably coupled to the outboard end portion via a pivot feature that is received within an opening of the tip sidewall; and a guide member received into the cavity, the guide member having a convex surface configured to reduce resistance between the outboard end portion of the fork structure and objects on a floor surface over which the load roller assembly is lifted during use.

13. The pallet truck of claim 12, wherein the body portion of the fork structure includes bottom walls integrally formed with and extending inwardly from respective ones of the opposing side walls.

14. The pallet truck of claim 12, wherein the fork structure includes a first region, a second region, and a seam between the first and second regions, wherein the first region is mechanically bent or pressed adjacent the seam to form the opposing sidewalls of the body portion, and wherein the second region is mechanically pressed adjacent the seam to form the tip sidewall of the outboard end portion.

15. The pallet truck of claim 12, wherein each of the opposing sidewalls of the body portion terminates at a vertical edge that is inset from the tip sidewall.

16. The pallet truck of claim 15, the load roller assembly includes an axle support member that is received into the cavity and configured to engage the vertical edge of a corresponding one of the opposing sidewalls.

* * * * *